United States Patent
Schediwy

(10) Patent No.: US 10,048,792 B1
(45) Date of Patent: Aug. 14, 2018

(54) SPACER ELEMENTS IN FORCE-SENSITIVE DISPLAY DEVICES

(71) Applicant: Synaptics Incorporated, San Jose, CA (US)

(72) Inventor: Richard Schediwy, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/610,600

(22) Filed: May 31, 2017

(51) Int. Cl.
*H03K 19/173* (2006.01)
*G06F 3/041* (2006.01)
*G06F 3/01* (2006.01)
*G06F 3/0354* (2013.01)

(52) U.S. Cl.
CPC ............ *G06F 3/0414* (2013.01); *G06F 3/016* (2013.01); *G06F 3/03547* (2013.01); *G06F 3/0418* (2013.01); *G06F 2203/04105* (2013.01)

(58) Field of Classification Search
CPC .... G06F 3/0414; G06F 3/016; G06F 3/03547; G06F 3/0418; G06F 2203/04105
USPC .......................................................... 326/41
See application file for complete search history.

(56) References Cited

U.S. PATENT DOCUMENTS

| | | | | |
|---|---|---|---|---|
| 2010/0277439 A1* | 11/2010 | Charlier | ................ | G06F 1/1616 345/176 |
| 2014/0203953 A1* | 7/2014 | Moser | ................... | G06F 3/0202 341/27 |
| 2014/0267128 A1* | 9/2014 | Bulea | ..................... | G06F 3/044 345/174 |
| 2015/0185946 A1* | 7/2015 | Fourie | ................... | G06F 3/0416 345/174 |
| 2015/0378391 A1* | 12/2015 | Huitema | ................. | G06F 1/163 361/679.03 |
| 2016/0103544 A1* | 4/2016 | Filiz | ....................... | G06F 3/0414 345/174 |
| 2017/0052616 A1* | 2/2017 | Lin | ......................... | G06F 3/044 |
| 2017/0235341 A1* | 8/2017 | Huitema | ............... | G06F 1/1652 361/679.03 |

* cited by examiner

*Primary Examiner* — Don Le
(74) *Attorney, Agent, or Firm* — Ferguson Braswell Fraser Kubasta PC

(57) ABSTRACT

An input device may include an input surface. The input device may further include a first display layer coupled to the input surface. The input device may further include a sensing element disposed on a second display layer and a spacer element disposed between the first display layer and the second display layer. The sensing element may be disposed below the spacer element. The sensing element may be further configured to detect an input force applied by an input object to the input surface.

17 Claims, 10 Drawing Sheets

SPACER ELEMENTS IN FORCE-SENSITIVE DISPLAY DEVICES

FIELD

This disclosure generally relates to electronic devices and more specifically, to force sensors.

BACKGROUND

Input devices, including proximity sensor devices (e.g., touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Moreover, input devices may be integrated into display devices. However, various problems exist in such an integration. For example, to produce a force-sensitive display device, force sensors within the display device may need to detect an input force through several layers of a display device, e.g., through several layers devoted to proximity sensing or performing various display functions.

SUMMARY

In one embodiment, an input device includes an input surface and a first display layer coupled to the input surface. The input device further includes a sensing element disposed on a second display layer and a spacer element disposed between the first display layer and the second display layer. The sensing element is disposed below the spacer element. The sensing element is further configured to detect an input force applied by an input object to the input surface.

In general, in one aspect, the invention relates to an electronic system that includes an input device. The input device includes an input surface and a first display layer coupled to the input surface. The input device further includes a sensing element disposed on a second display layer and a spacer element disposed between the first display layer and the second display layer. The sensing element is disposed below the spacer element. The sensing element is further configured to detect an input force applied by an input object to the input surface. The electronic system further includes a processing system coupled to the input device. The processing system is configured to obtain a resulting signal from the sensing element in response to an input force applied by an input object to the input surface. The processing system is further configured to determine force information using the resulting signal.

In general, in one aspect, the invention relates to a method that includes applying an input signal to a sensing element in an input device. The input device includes an input surface, a first display layer coupled to the input surface, a second display layer, and a spacer element disposed between the first display layer and the second display layer. The sensing element is disposed on the second display layer. The spacer element is disposed over at least a portion of the sensing element. The method further includes obtaining a resulting signal from the sensing element in response to an input force being applied by an input object to the input surface. The spacer element translates at least a portion of the input force to the sensing element. The method further includes determining, using the resulting signal, force information regarding the input force.

Other aspects of the disclosure will be apparent from the following description and the appended claims.

DETAILED DESCRIPTION

Figure 1:
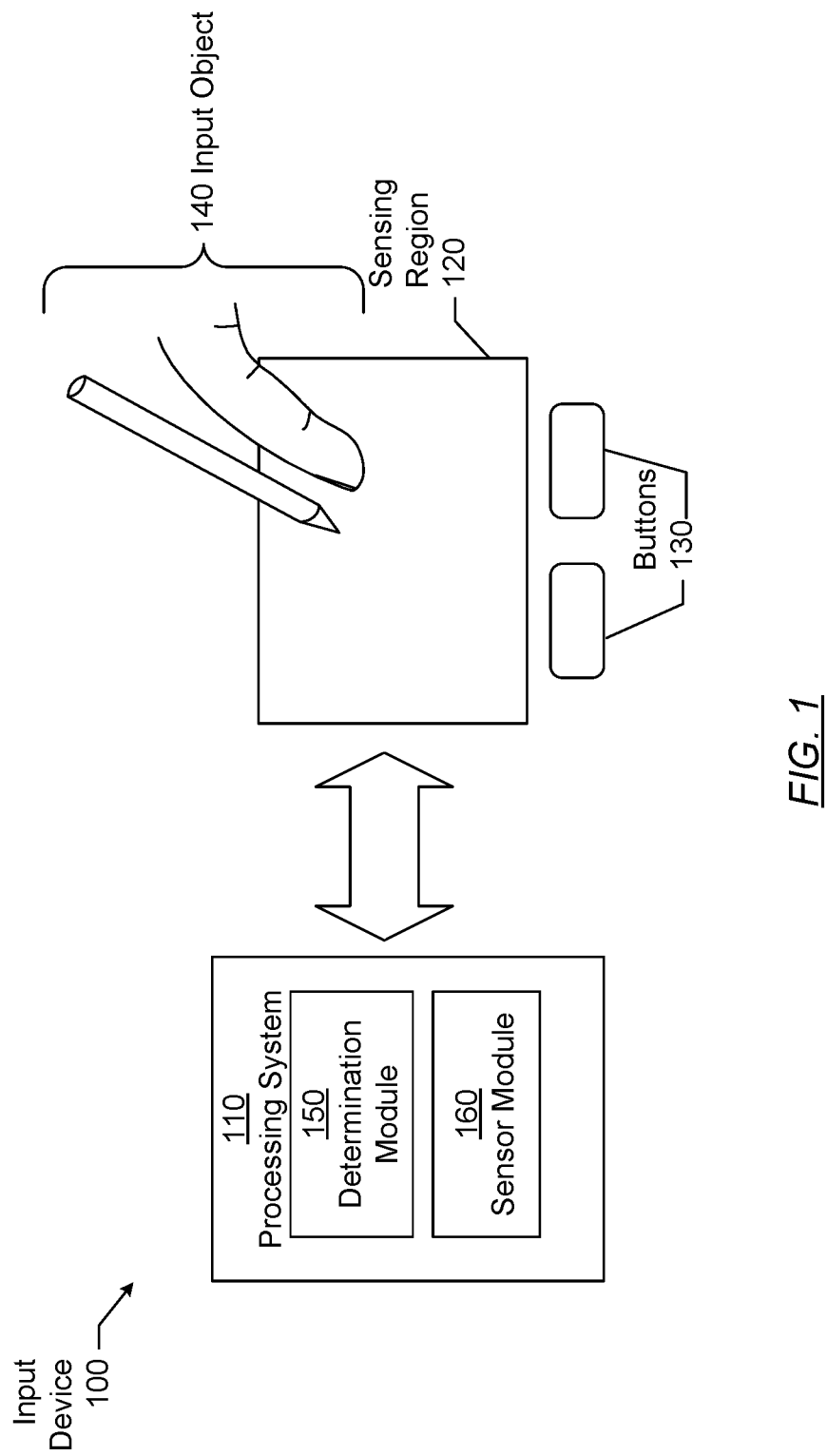
FIG. 1 shows a block diagram of an example system that includes an input device in accordance with an embodiment.

Specific embodiments of the disclosure will now be described in detail with reference to the accompanying figures. Like elements in the various figures may be denoted by like reference numerals and/or like names for consistency.

The following detailed description is merely exemplary in nature, and is not intended to limit the disclosure or the application and uses of the disclosed technology. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved usability. In particular, one or more embodiments of the disclosure are directed to providing a force-sensitive input device within a display device. In various embodiments, a spacer element is placed above a sensing element located on a display layer within the input device. A display layer may be a substrate within a display device that is configured to perform functionality such as generating an output to a user (e.g., with respect to audio and/or visual outputs), obtaining an input from a user (e.g., detect proximity of an input object at the display device), and/or providing physical support for one or more components within the display device. Accordingly, one or more display layers may operate cooperatively to perform a particular function with respect to the display device.

As an input object applies an input force to the input surface of the input device, a spacer element that is placed between the input surface and the sensing element and overlaps the sensing element may increase the amount of pressure detected by the sensing element. Thus, various sensing elements located between various display layers may have heightened force-sensitivity using one or more spacer elements proximate and overlapping the sensing elements.

The sensing elements may be a thin-film transistor (TFT) located within an organic light-emitting diode (OLED) display device or a liquid crystal display (LCD). In another embodiment, the sensing element may be part of a sensor layer disposed between various display layers of a display device.

Turning now to the figures, FIG. 1 is a block diagram of an exemplary input device (100), in accordance with embodiments of this disclosure The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Example communication protocols include I2C, SPI, PS/2, Universal Serial Bus (USB), Bluetooth®, RF, and IrDA protocols.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g., a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) may include one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing electrodes to create electric fields. In some capacitive implementations, separate sensing electrodes may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter signals may be electrically applied to transmitter electrodes. Receiver sensor electrodes may be held substantially constant relative to the reference voltage to facilitate receipt of resulting signals. The reference voltage may be a substantially constant voltage and, in various embodiments, the reference voltage may be system ground. The transmitter electrodes may be electrically driven with respect to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components. Accordingly, for at least the above-recited reasons, embodiments of the disclosure should not be considered limited to the specific arrangements of components and/or elements shown in FIG. 1.

Figure 2:
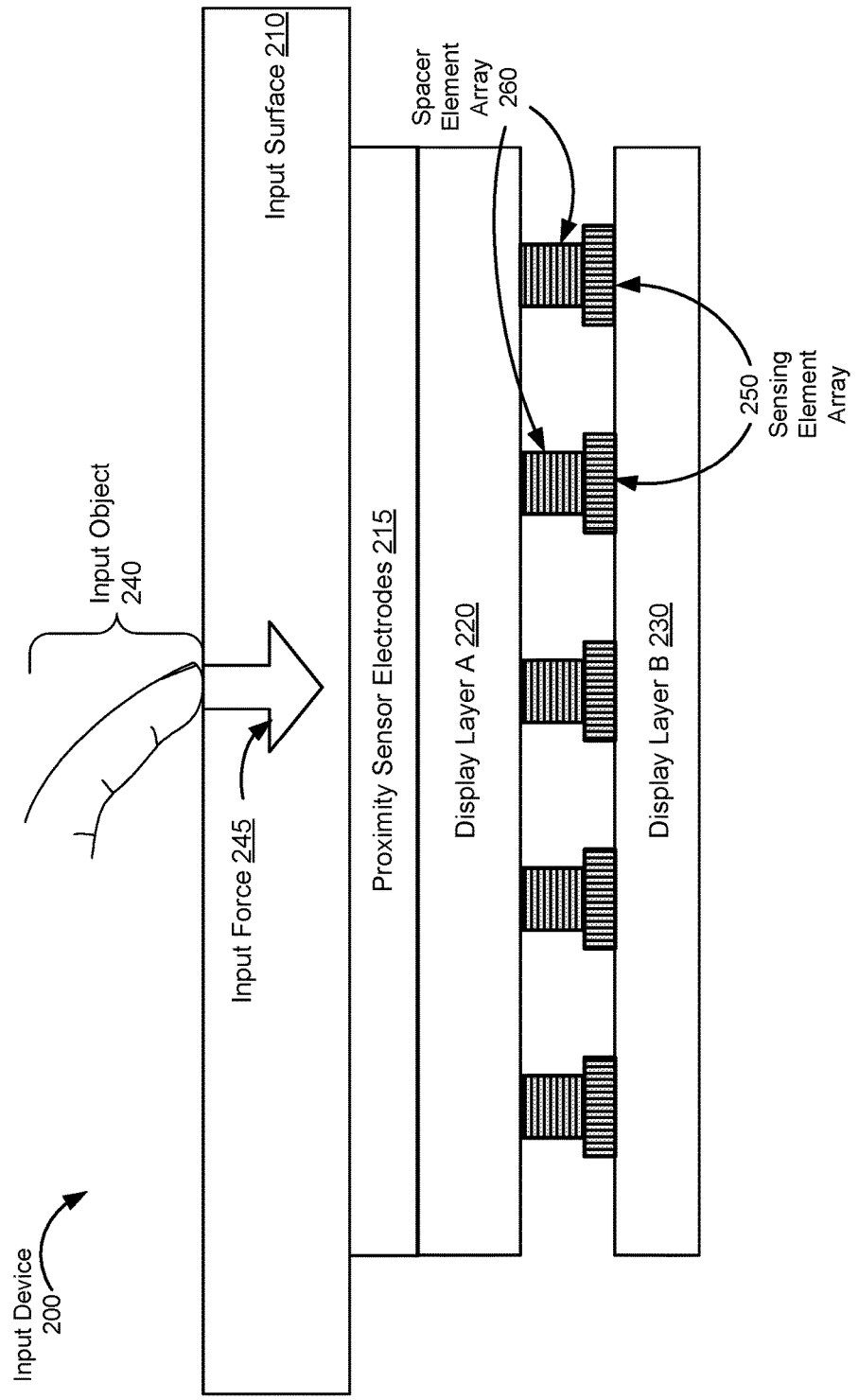
FIG. 2 shows a schematic view of an input device in accordance with one or more embodiments.

FIG. 2 shows a schematic view of an input device (200) in accordance with one or more embodiments. As shown in FIG. 2, the input device (200) may include an input surface (210), various proximity sensor electrodes (215), and various display layers (e.g., display layer A (220), display layer B (230)). The input device (200) may be a display device with functionality to present visual and/or audio data to a user. Accordingly, a display layer within the input device (200) may be any layer that provides a portion of a physical implementation of a display device, such as an LCD, a light-emitting diode (LED) display, an OLED display device, a field emission display, an interferometric modulator display, and various other display devices. For example, while display layer A (220) and display layer B (230) are identified in FIG. 2 as display layers, the input surface (210) and various other substrates (not shown) may also be display layers.

Further, the proximity sensor electrodes (215) in the input device (200) may include functionality for determining positional information regarding one or more input objects (e.g., input object (240)) in a sensing region. While the proximity sensor electrodes (215) are shown disposed directly underneath the input surface (210), the proximity sensor electrodes (215) may be disposed at various locations throughout the input device (200) and/or in various display layers of the input device (200) (not shown). Likewise, while the proximity sensor electrodes (215) may form a layer within the input device (200), in other embodiments, proximity sensor electrodes may be integrated into other layers of the input device (200) without being a separate distinct layer. In one or more embodiments, the proximity sensor electrodes (215) implement in-cell technology in the input device (200). For example, the proximity sensor electrodes (215) may include functionality for updating display pixels in one or more display layers in the input device (200). Moreover, proximity sensor electrodes (215) may include one or more transmitter electrodes, such as a common electrode, that transmits transmitter signals according to one or more frame types. In particular, different frame types may designate various time periods when the input device (200) is performing capacitive sensing, interference sensing, and/or display updating.

In one or more embodiments, the input device (200) includes various sensing elements (e.g., sensing element array (250)) disposed on a display layer (e.g., display layer B (230)) and approximately below various spacer elements (e.g., spacer element array (260)). For example, spacer elements may include various rigid structures with various shapes, such as dots, hemi-spheres or partial spheres, or any other regular or irregular, geometric shape. Spacer elements may be made from non-conductive materials, such as an insulator or dielectric material, which may be compressible or incompressible. Individual spacer elements in the spacer element array (260) may overlap at least a portion of a sensing element. Thus, an individual spacer element among the spacer element array (260) may increase pressure, i.e., force per unit of area, at a respective sensing element among the sensing element array (250). As such, the input device (240) may physically transfer the input force (245) through display layer A (220) and various intervening layers (not shown) to the spacer element array (260) and then to the sensing element array (250). Accordingly, the sensing element array (250) may experience increased precision in determining force information with respect to the input force (245). In one or more embodiments, an increase in overlap of a spacer element with a sensing element increases the amount of pressure detected by the sensing element. Likewise, a spacer element may be larger than a sensor element.

A sensing element may include various types of thin-film semiconductors, such as diodes, transistors, various electrode configurations, other semiconductor devices with two or more terminals, etc. In one or more embodiments, a sensing element with a respective spacer element includes functionality to act as a force sensor. Likewise, sensing elements without a respective spacer element may detect other physical characteristics, such as temperature, humidity, etc. In one or more embodiments, for example, a sensing element is a compensation sensor coupled to a respective force sensor. For more information on compensation sensors, see FIGS. 4, 5, and 7 and the accompanying description.

In one or more embodiments, a sensing element has a one-to-one correlation with a force sensor. For example, each pixel in a display device may include a single sensing element. However, some pixels may not include a spacer element. In particular, a predetermined grid of spacer elements may exist where one spacer element corresponds to a predetermined number of sensor elements or pixels in the display device.

In one or more embodiments, the sensing elements (250) are thin-film transistors. In particular, various types of TFT structures may be employed that include various arrangements of electrodes. In various TFT structures, for example, a thin-film transistor may include a source electrode and a gate electrode disposed inside a semiconductor layer, above a semiconductor layer, or in a gate insulator coupled to the semiconductor layer. Likewise, the semiconductor layer of a thin-film transistor may include amorphous silicon, polysilicon, and/or other types of TFT semiconductor material. In another embodiment, for example, the sensing elements (250) are organic thin-film transistors that use an organic semiconductor in the thin-film transistor's channel. Likewise, transparent thin-film transistors may be used for the sensing elements (250). Moreover, the gate electrode of a thin-film transistor may be disposed inside a gate insulator or above the gate insulator. Moreover, a spacer element may be disposed at least partially over a gate region of the thin-film transistor. In some embodiments, the spacer element may only cover the gate region of the thin-film transistor. Likewise, the spacer element may be smaller or larger than the gate region of the thin-film transistor.

With respect to force sensing, changes in an output current of a respective force sensor may be measured to detect changes in input force pressure. For example, input force pressure applied to a thin-film semiconductor may result in changes to threshold voltages, effective resistance of the thin-film semiconductor, and/or electron mobility of the thin-film semiconductor. In one or more embodiments, the amount of current flowing through a source electrode and a drain electrode of a thin-film transistor adjusts in response to an input force pressure applied by a spacer element to the thin-film transistor.

Figure 3:
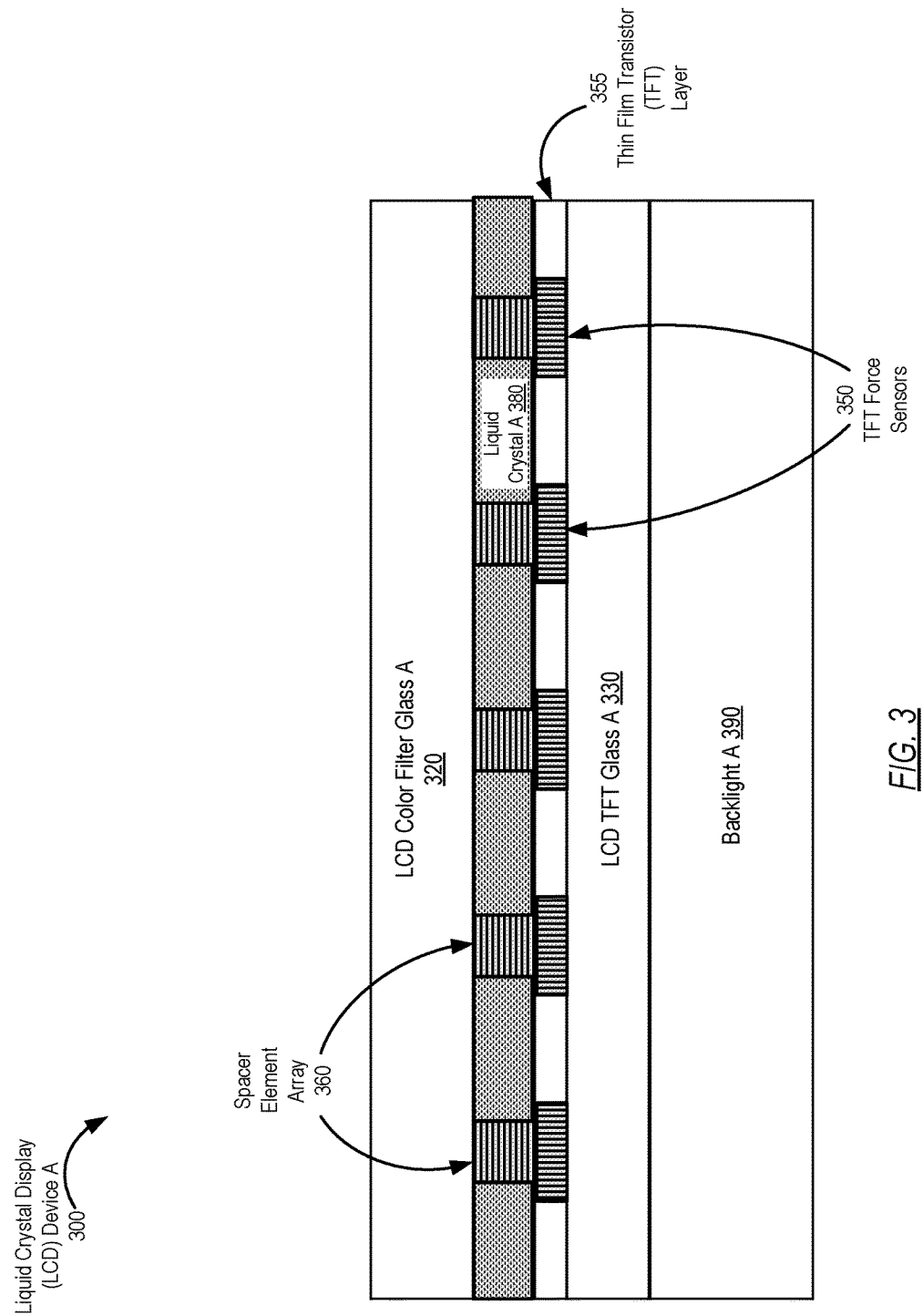
FIG. 3 shows a cross-section view of an LCD device in accordance with an embodiment.

Turning to FIG. 3, FIG. 3 shows a schematic view of an LCD device A (300) in accordance with one or more embodiments. As shown in FIG. 3, the LCD device A (300) may include various display layers (e.g., an LCD Color Filter Glass A (320), an LCD TFT Glass A (330)), a TFT layer (355) including various TFT force sensors (350), a spacer element array (360), and a backlight A (390). Specifically, liquid crystal (e.g., liquid crystal A (380)) may be disposed between the LCD color filter glass A (320) and the TFT layer (355) and around spacer elements in the spacer element array (360). Liquid crystal may include various types of liquid crystal fluids such as thermotropic liquid crystals and/or lyotropic liquid crystals. An LCD color filter glass substrate (e.g., LCD color filter glass A (320)) may be an approximately transparent substrate, e.g., glass, with a three-color pattern of red-green-blue (RGB) pixels disposed upon the transparent substrate. For example, the three-color pattern may be the product of a hardened photosensitive color resist coated on the glass substrate. A backlight (e.g., backlight A (390)) may be a white light source, such as a fluorescent lamp or other lighting device that includes functionality to transmit visible light through an LCD device to produce light within a predetermined color spectrum. While a backlight is shown in FIG. 3, in one or more embodiments, an LCD device may be implemented without a backlight. Likewise, while several display layers are shown in FIG. 3, an LCD device may include other display layers not shown, such as a reflector layer, a polarizer layer, a diffusing plate, various cathode and/or anode layers, a thin-film semiconductor layer for implementing an active-matrix LCD device, etc.

Similar to FIG. 2, in one or more embodiments, the LCD device A (300) includes various TFT force sensors (350) with functionality to detect an input force (not shown) applied to the surface of the LCD device A (300). The TFT force sensors (350) may be similar to sensing elements (250) described in FIG. 2 and the accompanying description, for example. Specifically, TFT force sensors (350) may be disposed on a TFT glass substrate (e.g., LCD TFT glass A (330)). A TFT glass substrate may be a transparent substrate, such as glass, with TFT force sensors and/or other TFT electrodes disposed on the TFT glass substrate. For example, the other TFT electrodes may include functionality to produce a voltage across liquid crystal (e.g., liquid crystal A (380)) that controls the transmission of light through the liquid crystal, and thus, the color of light exiting from an LCD color filter glass (e.g., LCD color filter glass A (320)).

Figure 4:
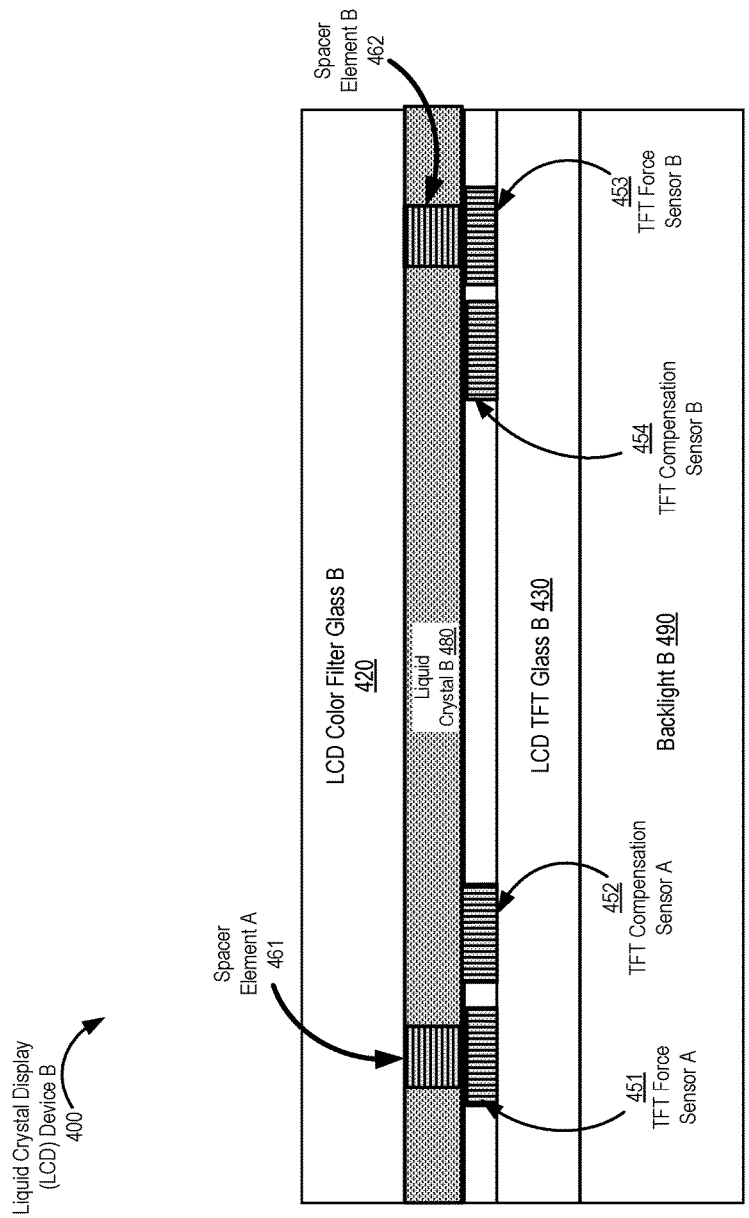
FIG. 4 shows a cross-section view of an LCD device in accordance with another embodiment.

Turning to FIG. 4, FIG. 4 shows a schematic view of an LCD device B (400) in accordance with one or more embodiments. As shown in FIG. 4, the LCD device B (400) may include various display layers (e.g., an LCD Color Filter Glass B (420), an LCD TFT Glass B (430), and a backlight B (490)). The LCD device B (400) may further include a spacer element A (461), a spacer element B (462), and liquid crystal B (480) disposed around the spacer element A (461) and the spacer element B (462). While spacer elements are shown along a liquid crystal layer in FIGS. 3 and 4, in one or more embodiments, spacer elements may be disposed within other display layers of an LCD device, such as above a polarizing layer, a reflector layer, etc.

In one or more embodiments, an LCD device includes one or more compensation sensors (e.g., TFT compensation sensor A (452), TFT compensation sensor B (454)) proximate a force sensor (e.g., TFT force sensor A (451), TFT force sensor B (453)). Compensation sensors may be similar to sensing elements in the sensing element array (250) described in FIG. 2 and the accompanying description. For example, while TFT force sensors may be force-sensitive, measurements detected by the TFT force sensors (451, 453) may also be sensitive to temperature effects. In one or more embodiments, to cancel various temperature effects, a TFT compensation sensor is coupled to a TFT force sensor to provide a reference transistor for a TFT force sensor. For example, TFT compensation sensor A (452) may generate a sensor value that is used to compensate for temperature effects within the LCD device B (400). If the TFT compensation sensor A (452) has an approximately identical geometry to TFT force sensor A (451), placing the two transistors in close proximity may produce similar changes in transistor currents and/or transistor voltages resulting from temperature effects surrounding both of the thin-film transistors. In one or more embodiments, a compensation sensor has substantially the same electrical properties as a force sensor in a display device.

As shown in FIG. 4, the spacer element A (461) may be disposed above the TFT force sensor A (451) to produce a force-sensitive thin-film transistor. Likewise, the TFT compensation sensor A (452) may have no spacer element overlapping a portion of the TFT compensation sensor A (452), and thus may not be sensitive to an input force applied to an input surface of the LCD device B (400). In particular, an input device implemented in the LCD device B (400) may be configured to avoid application of input force pressure to the TFT compensation sensor A (452) and TFT compensation sensor B (454), e.g., by having no spacer elements above the TFT compensation sensors (452, 454). Moreover, by using two thin-film transistors, force effects generated by an input force may be separated from temperature effects to both the TFT force sensor A (451) and the TFT compensation sensor A (452).

In one or more embodiments, the TFT compensation sensors (452, 454) are coupled to a processing system (not shown). For example, temperature effects in the TFT force sensors (451, 443) may be compensated through data processing by the processing system using various force information computations. Thus, the force information reported to a host device may be calibrated with measurements obtained from the TFT compensation sensors (452, 454). In one or more embodiments, for example, a TFT compensation sensor provides a reference value to the processing system. As such, the processing system may perform one or more data processing computations using the reference value to eliminate or reduce the temperature effects around a respective TFT force sensor. Likewise, the reference value may be implemented through analog circuitry as shown in FIG. 5 below.

Figure 5:
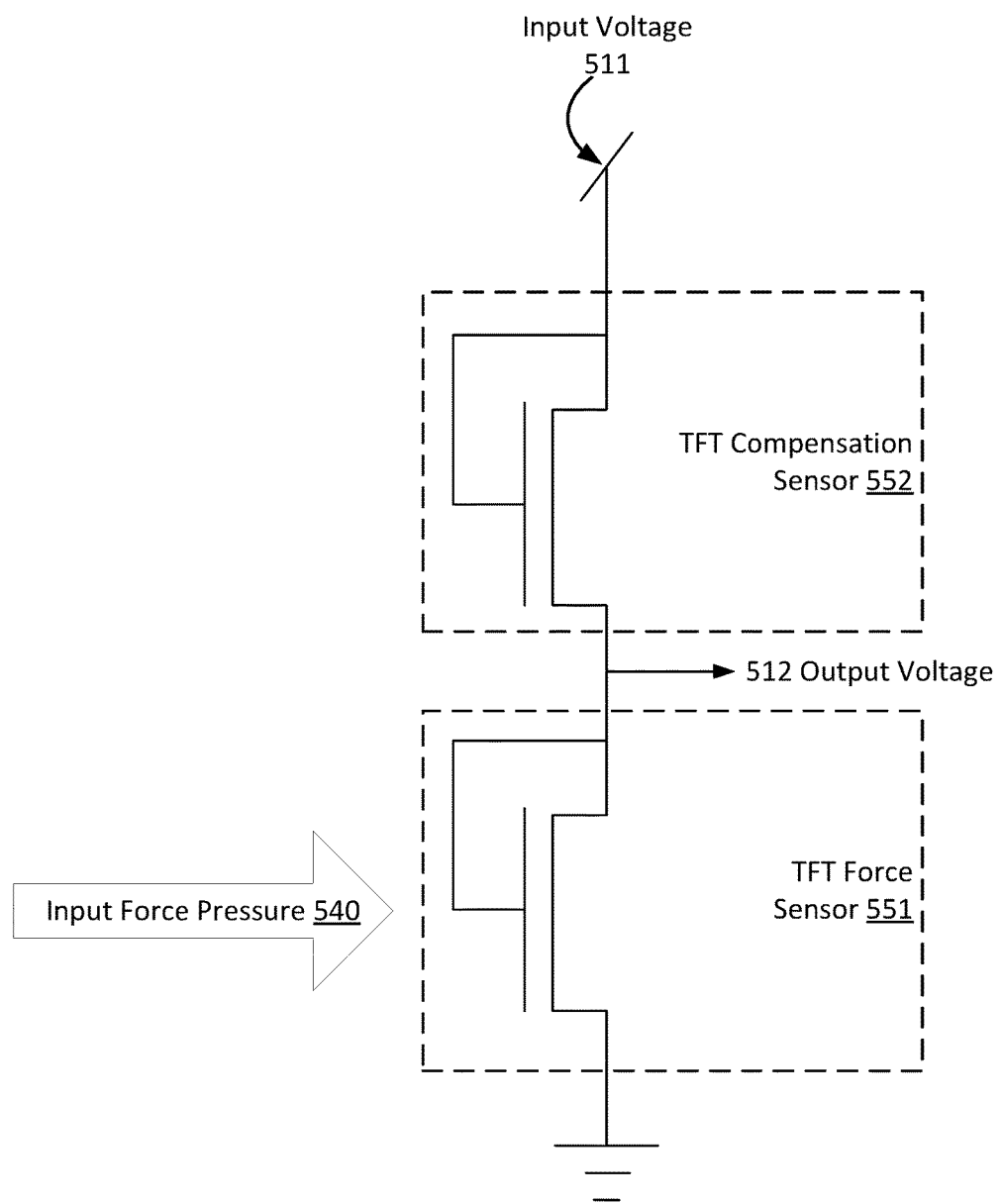
FIG. 5 shows an example of a TFT force sensor coupled to a TFT compensation sensor in accordance with one or more embodiments.

Turning to FIG. 5, FIG. 5 provides an example of a TFT force sensor coupled to a TFT compensation sensor. The following example is for explanatory purposes only and not intended to limit the scope of the disclosure.

In FIG. 5, a circuit is shown that includes a TFT force sensor (551) coupled to a TFT compensation sensor (552). As shown, TFT force sensor (551) may detect an input force pressure (540) produced by an input force that is exerted through an input surface (not shown) to a spacer element (not shown) to the TFT force sensor (551). An input voltage (511) (e.g., a drain voltage or a source voltage that may be controlled depending on the type of thin-film transistor used for the TFT compensation sensor (552) and the TFT force sensor (551)) may be applied to a terminal of the TFT compensation sensor (552). Furthermore, the TFT compensation sensor (552) may be connected to the TFT force sensor (551) using a half-bridge (e.g., half of a Wheatstone bridge) configuration. If no input force pressure is applied to the TFT force sensor (551), then the effective resistances of both thin-film transistors may be approximately the same, and the output voltage (512) may be half of the input voltage (511). As such, the terminal of the TFT compensation sensor (552) coupled to the output voltage (512) may provide a voltage that acts as a reference value within the circuit shown in FIG. 5.

If both thin-film transistors are heated approximately equally, the effective resistances of both thin-film transistors may change equally. As such, the output voltage (512) may remain approximately half of the input voltage (511). However, if the input force pressure (540) is applied to the TFT force sensor (551), the effective resistance of the TFT force sensor (551) may change while the effective resistance of the TFT compensation sensor (552) remains approximately the same. Thus, the circuit configuration in FIG. 5 may generate an output voltage (512) that changes as a function of an input force but not as a function of temperature.

While one circuit configuration is shown in FIG. 5, other circuit configurations and techniques may be used to perform various temperature cancellation processes using TFT compensation sensors and TFT force sensors.

Figure 6:
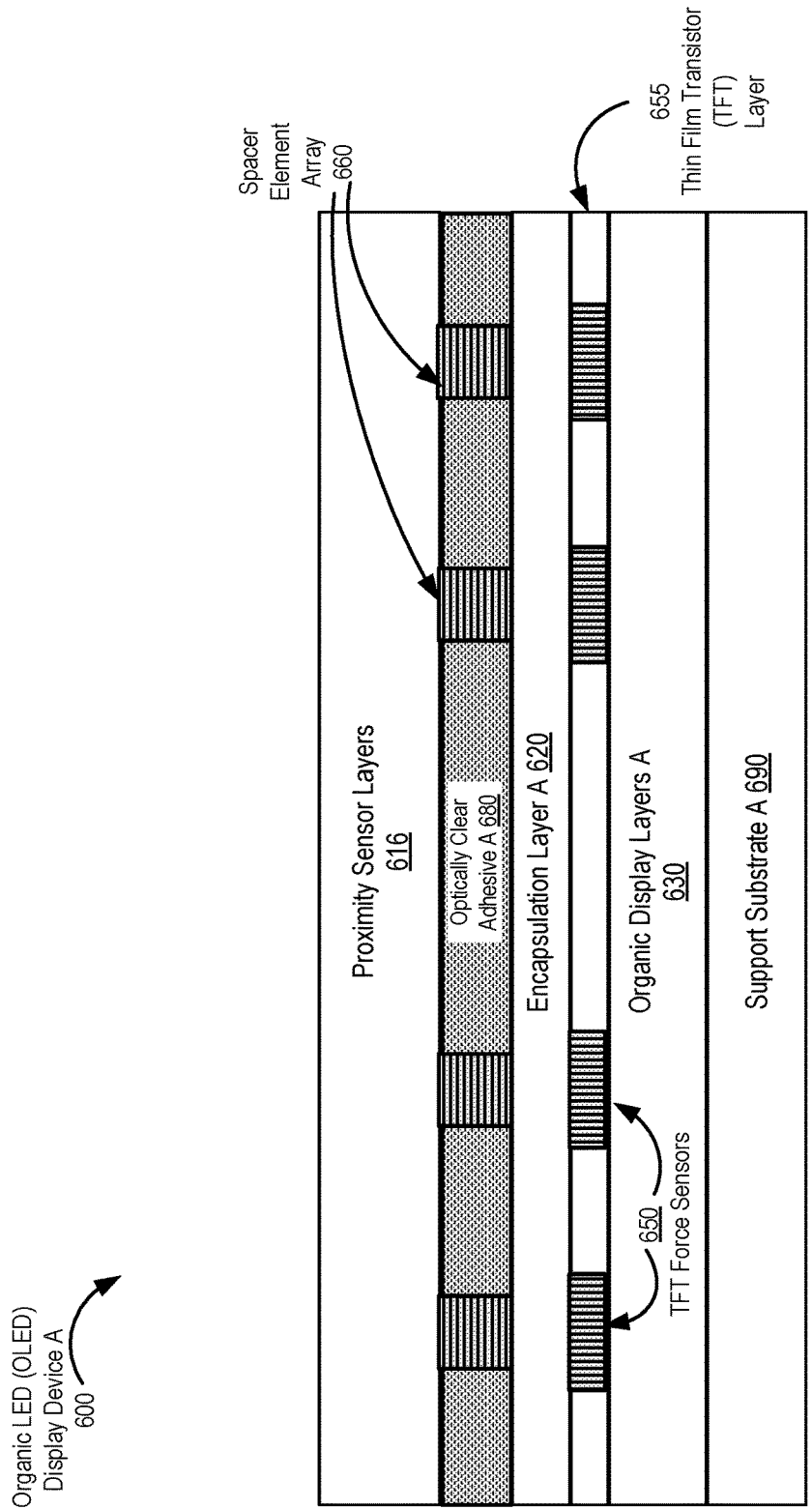
FIG. 6 shows a schematic view of an OLED display device in accordance with one or more embodiments.

Turning to FIG. 6, FIG. 6 shows a schematic view of an OLED display device A (600) in accordance with one or more embodiments. As shown in FIG. 6, the OLED display device A (600) may include various display layers (e.g., proximity sensor layers (616), an encapsulation layer A (620), organic display layers A (630), and a support substrate A (690)), such as glass, a TFT layer (655) including various TFT force sensors (650), and a spacer element array (660). For example, the OLED display device A (600) may be a white OLED, a foldable OLED, a transparent OLED, a passive-matrix or active-matrix OLED, a top-emitting OLED, or among various other types of OLED devices.

Moreover, the OLED display device A (600) may include proximity-sensing functionality that detects the location of one or more input objects disposed in a sensing region. For example, the OLED display device A (600) may include various proximity sensor layers (616) that include one or more substrates with transmitter electrodes and/or receiver electrodes. The transmitter electrodes and/or the receiver electrodes in the proximity sensor layers (616) may be similar to the transmitter electrodes and/or receiver electrodes described above in FIG. 1 and the accompanying description.

In particular, the OLED display device A (600) may include various organic display layers (e.g., organic display layers A (630)) composed of organic molecules or polymers. The organic display layers A (630) may include functionality to generate visible light that presents visual data to a user. For example, the organic display layers A (630) may include an emissive layer and a conductive layer. Likewise, the OLED display device A (600) may also include various non-organic display layers (not shown) such as a cathode layer and/or an anode layer that include functionality for operating organic display layers. Moreover, intersections of a cathode layer and an anode layer may be arranged to form various pixels within the OLED display device A (600). Different types of visible light may be generated by a particular pixel within the OLED display device A (600). Further, organic display layers may be disposed on a support substrate (e.g., support substrate A (690)) that may be flexible or rigid.

Keeping with FIG. 6, the OLED display device A (600) may include an encapsulation layer (e.g., encapsulation layer A (620)) that includes functionality to provide a barrier around various organic display layers (e.g., organic display layers A (630)). For example, the encapsulation layer A (620) may be a single layer or multiple layers disposed on the organic display layers A (630). As such, the encapsulation layer A (620) may be a thin film that includes organic and/or inorganic chemical layers that protects various organic display layers from oxygen, water vapor, and/or other harmful substances to OLEDs.

In one or more embodiments, the OLED display device A (600) includes a TFT layer (655) that includes various TFT force sensors (650) with functionality to detect an input force (not shown) applied to a surface of the OLED display device A (600). The TFT force sensors (650) may be similar to sensing elements (250) described above in FIG. 2 and the accompanying description. Specifically, the TFT force sensors (650) may be disposed below the encapsulation layer A (620) in an oxygen-protected region of the OLED display device A (600). For example, other TFT electrodes may exist in the protected region along with the TFT force sensors (650). The other TFT electrodes may include functionality to implement an active-matrix OLED device, for example, that controls image generation within the OLED display device A (600). While several types of display layers are shown in FIG. 6, an OLED display device may include other display layers not shown, such as an additional encapsulation layer, a buffer layer, a TFT backplane, etc.

Similar to FIGS. 2, 3, and 4, in one or more embodiments, an OLED display device (e.g., OLED display device A (600)) includes a spacer element array (e.g., spacer element array (660)) that includes functionality to transmit an input force to various TFT force sensors (e.g., TFT force sensors (650)). In one or more embodiments, for example, the spacer element array (660) may be disposed above the encapsulation layer A (620) and below the proximity sensor layers (616). In particular, an optically clear adhesive (e.g., optically clear adhesive A (680)) may be placed around the spacer elements in the spacer element array (660) to form a bond between the proximity sensor layers (616) (or other display layers not shown) and the encapsulation layer A (620).

Figure 7:
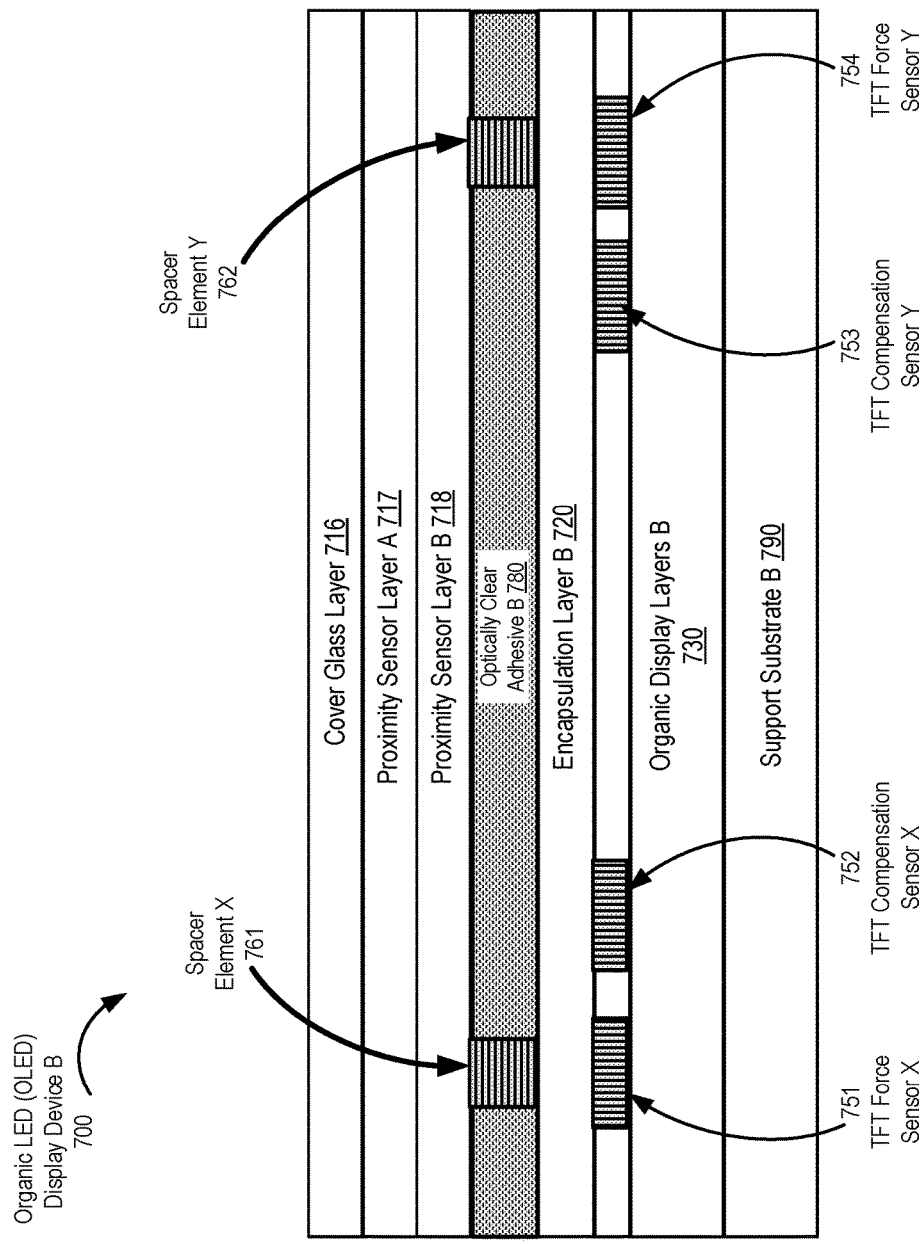
FIG. 7 shows a schematic view of an OLED display device in accordance with one or more embodiments.

Turning to FIG. 7, FIG. 7 shows a schematic view of an OLED display device B (700) in accordance with one or more embodiments. As shown in FIG. 7, the OLED display device B (700) may include various display layers (e.g., cover glass layer (716), proximity sensor layer A (717), proximity sensor layer B (718), encapsulation layer B (720), organic display layers B (730), and support substrate B (790)). The cover glass layer (716) may be the input surface of the OLED display device B (700). The OLED display device B (700) may further include a spacer element X (761), a spacer element Y (762), and an optically clear adhesive B (780) disposed around the spacer element X (761) and the spacer element Y (762). While spacer elements are shown in the same layer as the optically clear adhesive in FIGS. 6 and 7, in one or more embodiments, spacer elements may be disposed inside other display layers of an OLED display device, such as above an organic display layer, a proximity sensor layer, etc.

In one or more embodiments, an OLED device includes one or more compensation sensors (e.g., TFT compensation sensor X (752), TFT compensation sensor Y (753)) coupled with a force sensor (e.g., TFT force sensor X (751), TFT force sensor Y (754)). In one or more embodiments, for example, TFT compensation sensor X (752) and/or TFT compensation sensor Y (753) may be similar to TFT compensation sensor A (452), TFT compensation sensor B (454), and/or TFT compensation sensor (552) described in FIGS. 4 and 5 and the accompanying description. As shown in FIG. 7, for example, the spacer element X (761) may overlap at least a portion of the TFT force sensor X (751) within the OLED display device B (700) to produce a force-sensitive thin-film transistor. Likewise, the TFT compensation sensor X (752) may have no spacer element overlapping any portion above it, and thus may not be sensitive to an input force applied to the cover glass layer (716). Moreover, by using two thin-film transistors, effects of an input force to the TFT force sensor X (751) may be separated from temperature effects to both the TFT force sensor X (751) and the TFT compensation sensor X (752).

While FIGS. 2-4 and 6-7 show various configurations of components, other configurations may be used without departing from the scope of the disclosure. For example, various components of FIGS. 2-4 and 6-7 may be combined to create a single component. Likewise, the functionality performed by a single component may be performed by two or more components of FIGS. 2-4 and 6-7. Accordingly, for at least the above-recited reasons, embodiments of the disclosure should not be considered limited to the specific arrangements of components and/or elements shown in FIGS. 2-4 and 6-7.

Figure 8A:
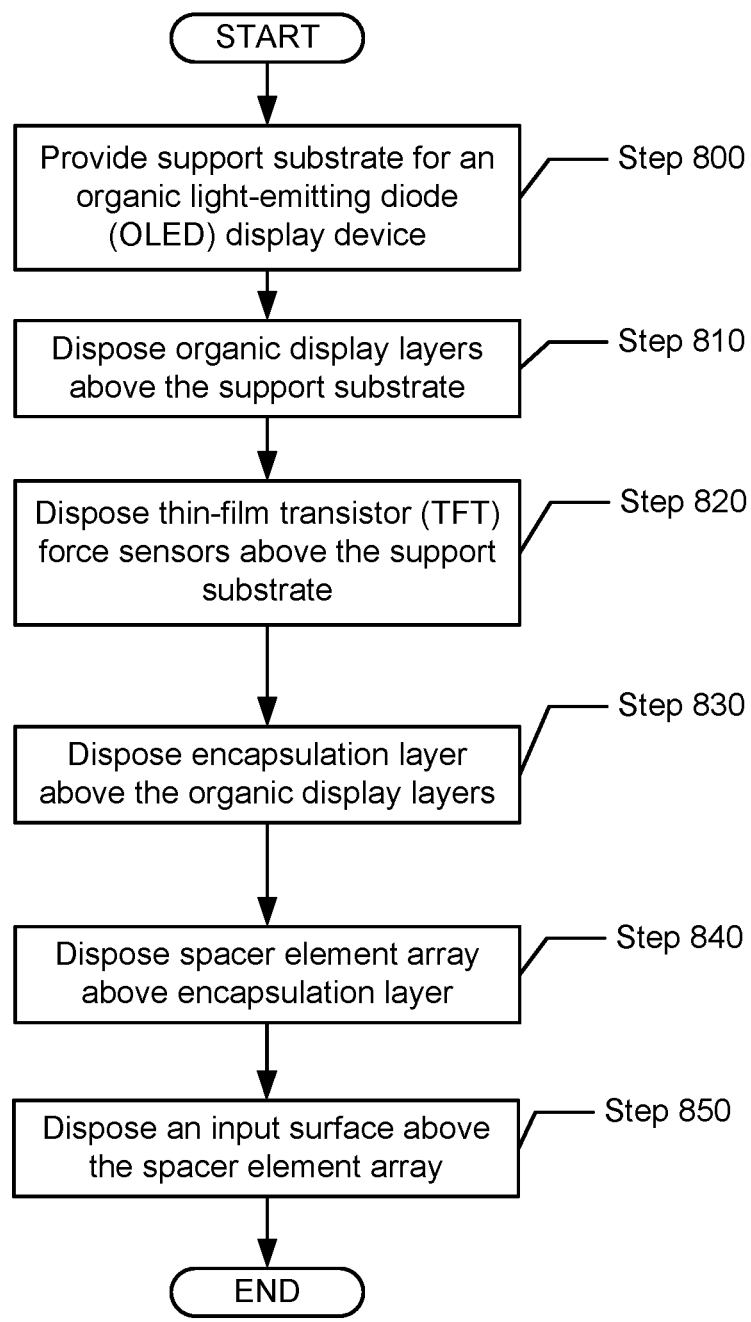
FIG. 8A shows a flowchart for manufacturing an OLED display device in accordance with one or more embodiments.

Turning to FIG. 8A, FIG. 8A shows a flowchart in accordance with one or more embodiments. Specifically, FIG. 8A describes a method for manufacturing an OLED display device. The process shown in FIG. 8A may involve, for example, one or more components discussed above in reference to FIGS. 1-7 (e.g., sensing element array (250)). While the various steps in FIG. 8A are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 800, a support substrate is provided for an OLED display device in accordance with one or more embodiments. Specifically, the support substrate in Step 800 may be similar to the support substrate as described in FIGS. 6 and 7 and the accompanying description. For example, the support substrate may be reflective, transparent, an opaque material, glass, and/or plastic material. Likewise, the support substrate may be rigid or flexible.

In Step 810, various organic display layers are disposed above a support substrate in accordance with one or more embodiments. Specifically, the organic display layers in Step 810 may be similar to the organic display layers as described in FIGS. 6 and 7 and the accompanying description. In one or more embodiments, for example, an encapsulation layer is disposed between the organic display layers and the support substrate. In particular, where a support substrate is permeable to oxygen, such as with a plastic support substrate, the encapsulation layer may protect the organic display layers from oxygen contacting the organic display layers. Likewise, if the support substrate is impermeable to oxygen, an encapsulation layer between the support substrate may be eliminated.

In Step 820, various TFT force sensors are disposed above a support substrate in accordance with one or more embodiments. Specifically, the TFT force sensors in Step 820 may be similar to the force sensors and/or TFT force sensors as described in FIGS. 2, 6, and 7 and the accompanying description. For example, the TFT force sensors maybe disposed between one or more organic display layers from Step 810. In one or more embodiments, for example, the TFT force sensors are thin-film semiconductors that also control image generation with an OLED display device and implement an active-matrix with the organic display layers from Step 810. Likewise, in another embodiment, the TFT force sensors are only used for force-sensing and operate independently of image generation in an OLED display device.

In one or more embodiments, the TFT force sensors are coupled to a processing system. In particular, the processing system may be similar to processing system (110) as described in FIG. 1 and the accompanying description. For example, an input force may be applied by an input object to an input surface of an OLED display device. Accordingly, in response to the input force, a processing system may obtain various resulting signals from the TFT force sensors with respect to the input force. Using the resulting signals, the processing system may determine force information. As such, the processing system may use the force information to determine various interface actions within a graphical user interface provided by the OLED display device and/or report the force information to a host device.

In one or more embodiments, the TFT force sensors include one or more TFT compensation sensors. For example, TFT compensation sensors may be interspersed in the same TFT layer as the TFT force sensors. In another embodiments, the TFT compensation sensors may be disposed in a separate TFT layer from the layer with the TFT force sensors.

In Step 830, an encapsulation layer is disposed above various organic display layers in accordance with one or more embodiments. Specifically, the encapsulation layer in Step 830 may be similar to the encapsulation layers as described in FIGS. 6 and 7 and the accompanying description. For example, the encapsulation layer in Step 830 may be disposed above the TFT force sensors as shown in FIGS. 6 and/or 7. In one or more embodiments, the encapsulation layer is between the TFT force sensors in Step 820 and the organic display layers in Step 810. For example, an OLED display device may include multiple thin-film semiconductor layers inside and outside the barrier region produced by the encapsulation layer. Moreover, the encapsulation layer may be disposed using various deposition techniques, such as atomic layer deposition, vacuum polymer technology, plasma enhanced chemical vapor deposition, etc.

In Step 840, a spacer element array is disposed above an encapsulation layer in accordance with one or more embodiments. Specifically, the spacer elements in the spacer element array in Step 840 may be similar to the spacer elements as described in FIGS. 2, 3, 4, 5, 6, and 7 and the accompanying description. In one or more embodiments, for example, the spacer element array is disposed between the encapsulation layer from Step 830 and the support substrate from Step 820. Likewise, the spacer element array may be disposed above the encapsulation layer from Step 830 in a similar manner as shown in FIGS. 6 and 7.

In Step 850, an input surface is disposed above a spacer element array in accordance with one or more embodiments. For example, one or more display layers may be disposed above the encapsulation layer from Step 830. In particular, a cover glass layer may be disposed above the encapsulation layer that provides an input surface for a user. In one or more embodiments, a proximity sensing input device is implemented using one or more proximity sensor electrodes disposed in one or more proximity sensing layers.

Figure 8B:
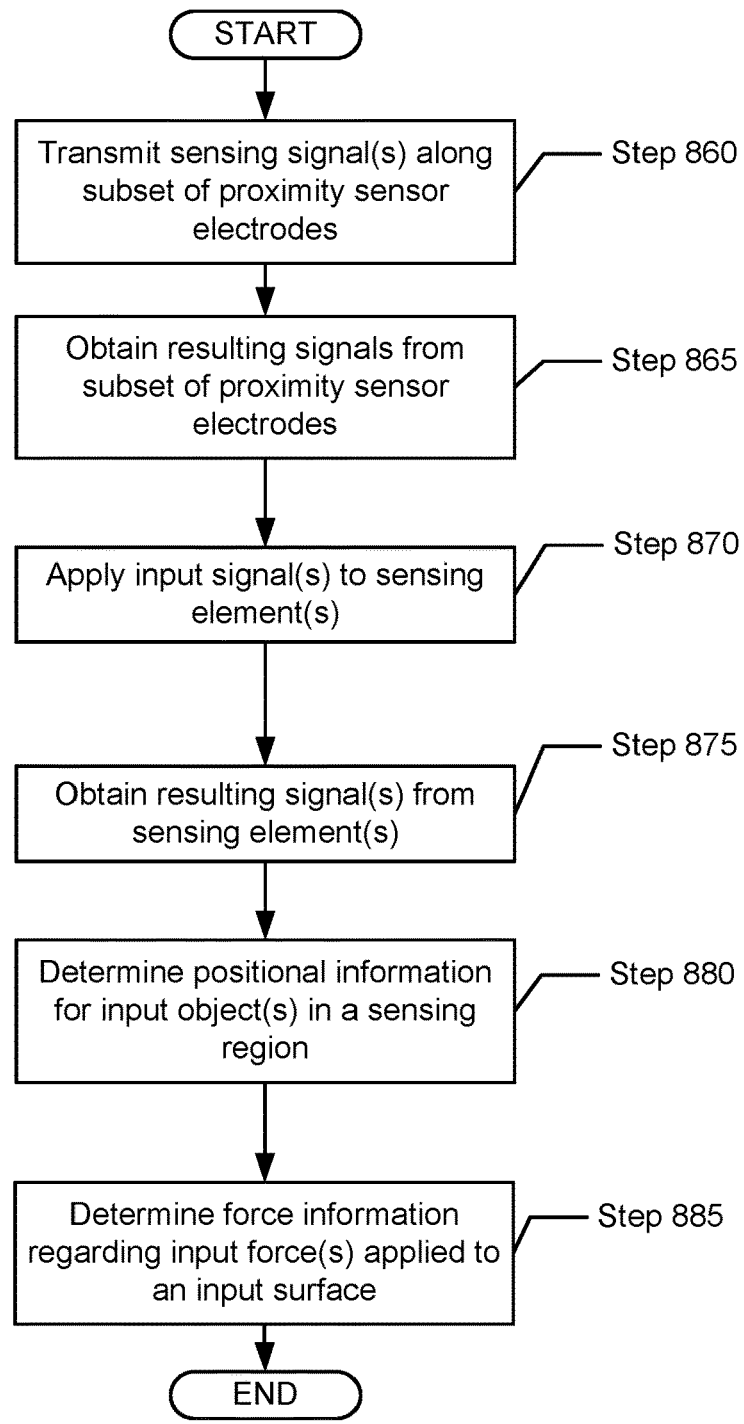
FIG. 8B shows a flowchart for operating a display device in accordance with one or more embodiments.

Turning to FIG. 8B, FIG. 8B shows a flowchart in accordance with one or more embodiments. Specifically, FIG. 8B describes a method for operating a display device. The process shown in FIG. 8B may involve, for example, one or more components discussed above in reference to FIGS. 1-7 (e.g., sensing element array (250)). While the various steps in FIG. 8B are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 860, one or more sensing signals are transmitted along a subset of proximity sensor electrodes in accordance with one or more embodiments. For example, the subset of proximity sensor electrodes in Step 860 may be similar to the proximity sensor electrodes (215) described in FIG. 2 and the accompanying description and/or the proximity sensor layers described in FIGS. 6-7 and the accompanying description. Likewise, the subset of proximity sensor electrodes may be transmitter electrodes as described in FIG. 1 and the accompanying description. Moreover, the one or more sensing signals may be transmitter signals as described in FIG. 1 and the accompanying description.

In Step 865, various resulting signals are obtained from a subset of proximity sensor electrodes in accordance with one or more embodiments. For example, the subset of proximity sensor electrodes in Step 865 may be similar to the proximity sensor electrodes (215) described in FIG. 2 and/or the proximity sensor layers described in FIGS. 6-7 and the accompanying description.

In Step 870, one or more input signals are applied to one or more sensing elements in accordance with one or more embodiments. In one or more embodiments, for example, an input signal is similar to the input voltage (511) describe in FIG. 5 and the accompanying description. The input signals may be constant voltages or currents applied to the one or more sensing elements. Likewise, one input signal may be used to drive two or more sensing elements. The sensing elements in Step 870 may be similar to the sensing elements in the sensing element array (250) described in FIG. 2 and the accompanying description. For example, the sensing elements may be force sensors and/or compensation sensors disposed within a display device. In one or more embodiments, a sensing element is a thin-film semiconductor disposed between display layers where a spacer element overlaps a portion of the sensor element.

In Step 875, one or more resulting signals are obtained from one or more sensing elements in accordance with one or more embodiments. In one or more embodiments, for example, a resulting signal in Step 875 is similar to the output voltage (512) describe in FIG. 5 and the accompanying description. Specifically, the resulting signals in Step 875 may change in amplitude in response to an input force applied to an input surface of a display device. As such, based on the magnitude of an input force pressure applied to a sensing element within the display device, the one or more resulting signals may adjust accordingly.

In Step 880, positional information is determined for one or more input objects in a sensing region in accordance with one or more embodiments. Using the resulting signals from Step 865, for example, the location of an input object in a sensing region above an input surface may be computed by a processing system. In one or more embodiments, positional information is detected for multiple input objects in the sensing region. Likewise, the positional information may be reported to a host device for further processing, for example, to trigger an interface action in a graphical user interface on a display device.

In Step 885, force information is determined regarding one or more input forces applied to an input surface in accordance with one or more embodiments. Using the one or more resulting signals from Step 875, for example, a magnitude of an input force may be computed by a processing system. In particular, the processing system may determine whether one or more input forces exceed one or more force thresholds. As such, the force information may be reported to a host device for further processing, for example, to trigger an interface action in a graphical user interface on a display device.

Figure 9:
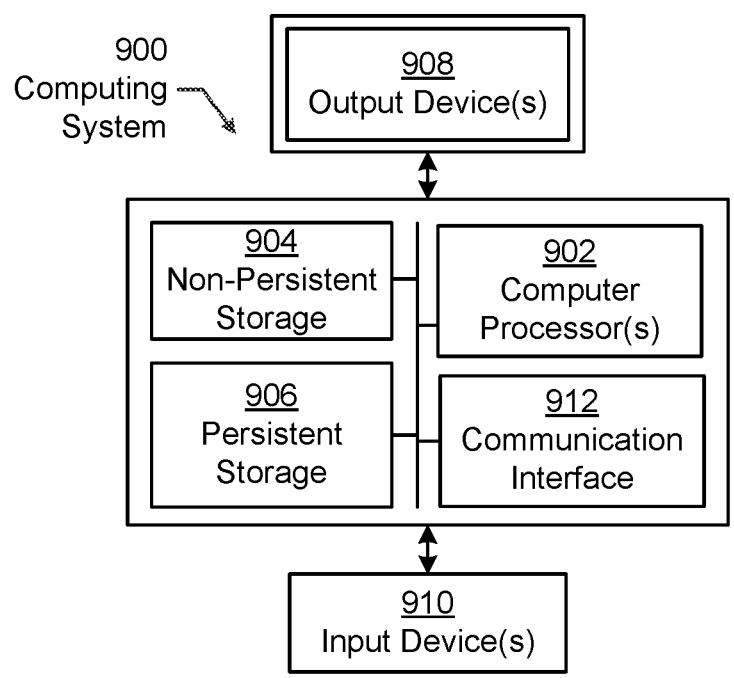
FIG. 9 shows a computing system in accordance with one or more embodiments.

Embodiments may be implemented on a computing system. Any combination of mobile, desktop, server, router, switch, embedded device, or other types of hardware may be used. For example, as shown in FIG. 9, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

The computing system in FIG. 9 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or a data container (e.g., database, table, record, column, view, etc.), identifier(s), conditions (e.g., comparison operators), functions (e.g., join, full join, count, average, etc.), sort (e.g., ascending, descending), or others. The DBMS may execute the statement. For example, the DBMS may access a memory buffer, may access a reference, or may index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 9 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. An input device comprising:
   an input surface;
   a first display layer coupled to the input surface;
   a first sensing element disposed on a second display layer;
   a spacer element disposed between the first display layer and the second display layer,
      wherein the first sensing element is disposed below the spacer element, and wherein the first sensing element is configured to detect an input force applied by an input object to the input surface; and
   a second sensing element disposed on the second display layer and proximate the first sensing element,
      wherein the second sensing element is configured not to sense force, and wherein the second sensing element provides a reference value for compensating temperature effects on the first sensing element.

2. The input device of claim 1,
   wherein the first sensing element is a thin-film semiconductor comprising a first electrode and a second electrode,
   wherein the thin-film semiconductor is configured to adjust an amount of current flowing through the first electrode to the second electrode in response to the input force applied by the input object.

3. The input device of claim 1, further comprising:
a processing system coupled to the first sensing element and the second sensing element,
wherein the processing system is configured to determine force information using a resulting signal from the second sensing element to compensate a resulting signal obtained from the first sensing element.

4. The input device of claim 3, wherein the first sensing element and the second sensing element are configured to have substantially the same electrical properties.

5. The input device of claim 1, further comprising:
a liquid crystal layer disposed around the at least one spacer element and between the first display layer and the second display layer,
wherein the first display layer is a color filter glass for a liquid crystal display CD), and
wherein the second display layer is a thin-film transistor glass substrate.

6. The input device of claim 1, further comprising:
an encapsulation layer disposed between the at least one spacer element and the first sensing element,
wherein the second display layer is an organic display layer.

7. The input device of claim 1, further comprising:
a plurality of proximity sensors below the input surface and above the first display layer, the plurality of proximity sensor electrodes configured to detect a location of the input object in a sensing region of the input device,
a third display layer disposed between the plurality of proximity sensor electrodes and the first display layer,
wherein the input surface and the third display layer are configured to transfer the input force to the first display layer.

8. The input device of claim 7,
wherein the plurality of proximity sensors comprise a common electrode that is configured to transmit a plurality of transmitter signals for capacitive sensing and updating display pixels in one or more display layers.

9. The input device of claim 1,
wherein the first display layer is the input surface.

10. An electronic system, comprising:
an input device, the input device comprising:
an input surface,
a first display layer coupled to the input surface,
a first sensing element disposed on a second display layer, and
at least one spacer element disposed between the first display layer and the second display layer, wherein the first sensing element is disposed below the at least one spacer element, and
a second sensing element disposed on the second display layer and coupled to the first sensing element,
wherein the input device is configured to avoid application of the input force to the second sensing element, and
wherein the second sensing element provides a reference value for compensating for temperature effects on the first sensing element; and
a processing system coupled to the input device, the processing system configured to:
obtain a resulting signal from the first sensing element in response to an input force applied by an input object to the input surface; and
determine force information using the resulting signal.

11. The electronic system of claim 10,
wherein the first sensing element is a thin-film semiconductor comprising a first electrode and a second electrode,
wherein the thin-film semiconductor is configured to adjust an amount of current flowing through the first electrode to the second electrode in response to the input force applied by the input object.

12. The electronic system of claim 10, wherein the input device further comprises:
a processing system coupled to the first sensing element and the second sensing element,
wherein the processing system is configured to determine force information using the resulting signal from the second sensing element to compensate the resulting signal obtained from the first sensing element.

13. The electronic system of claim 10, wherein the input device further comprises:
a liquid crystal layer disposed around the at least one spacer element and between the first display layer and the second display layer,
wherein the first display layer is a color filter glass for a liquid crystal display (LCD), and
wherein the second display layer is a thin-film transistor glass substrate.

14. The electronic system of claim 10, wherein the input device further comprises:
an encapsulation layer disposed between the at least one spacer element and the first sensing element,
wherein the second display layer is an organic display layer for operating an organic light-emitting diode (OLED) display device.

15. The electronic system of claim 10, wherein the input device further comprises:
a plurality of proximity sensors below the input surface and above the first display layer, the plurality of proximity sensor electrodes configured to detect a location of the input object in a sensing region,
a third display layer disposed between the plurality of proximity sensor electrodes and the first display layer,
wherein the input surface and the third display layer are configured to provide a translation of the input force to the first display layer.

16. A method, the method comprising:
applying an input signal to a first sensing element in an input device, wherein the input device comprises an input surface, a first display layer coupled to the input surface, a second display layer, and a spacer element disposed between the first display layer and the second display layer, wherein the first sensing element is disposed on the second display layer, and wherein the spacer element is disposed over at least a portion of the first sensing element;
adjusting, using a second sensing element in the input device, the force information to produce adjusted force information, wherein the second sensing element provides a reference value for compensating temperature effects on the first sensing element;
obtaining a resulting signal from the first sensing element in response to an input force being applied by an input object to the input surface, wherein the spacer element translates at least a portion of the input force to the first sensing element; and
determining, using the resulting signal, force information regarding the input force.

17. The method of claim 16, further comprising:
transmitting one or more sensing signals to one or more transmitter electrodes in the input device;
obtaining a plurality of resulting signals from a plurality of receiver electrodes in the input device in response to the input object being in a sensing region of the input device; and
determining, using the plurality of resulting signals, positional information regarding a location of the input object in the sensing region.

\* \* \* \* \*